United States Patent [19]
Touchstone

[11] 3,752,269
[45] Aug. 14, 1973

[54] QUICK SLACK ADJUSTER FOR LOCOMOTIVE BRAKES

[76] Inventor: Roy Henry Touchstone, P.O. Box 2003, Jackson, Tenn. 38301

[22] Filed: Sept. 29, 1971

[21] Appl. No.: 184,798

Related U.S. Application Data

[63] Continuation-in-part of Ser. No. 815,062, April 10, 1969, Pat. No. 3,613,840.

[52] U.S. Cl. .............................................. 188/197
[51] Int. Cl. ........................................... F16d 65/44
[58] Field of Search ............ 74/522; 188/56, 196 M, 188/197

[56] References Cited
UNITED STATES PATENTS
3,613,840  10/1971  Touchstone ...................... 188/197

Primary Examiner—Duane A. Reger
Attorney—William S. Dorman

[57] ABSTRACT

A brake adjustment device for locomotives wherein slack in the brake mechanism may be quickly and easily adjusted, and the brake shoes may be quickly removed and replaced when they have become sufficiently worn, or are otherwise damaged or in need of repair. The adjustment device includes an apertured slide bar connected with a brake lever and extending through a trunnion carried by the pull rods whereby the brake may be quickly adjusted by pulling the slide bar through the trunnion and securing the bar in the proper position by inserting a keeper pin through the slide bar and trunnion. Spring urged lever means is provided for retaining the keeper pin in position. In addition, the slide bar device facilitates release of the brake lever to provide for a quick clearance between the brake shoe and wheel, thus reducing the time required for the replacement of worn brake shoes.

5 Claims, 6 Drawing Figures

Patented Aug. 14, 1973

INVENTOR.
ROY H. TOUCHSTONE

BY William S. Dorman

ATTORNEY

INVENTOR.
ROY H. TOUCHSTONE
BY William S. Dorman
ATTORNEY

QUICK SLACK ADJUSTER FOR LOCOMOTIVE BRAKES

This application is a Continuation-In-Part of my co-pending U.S. Pat. application Ser. No. 815,062, filed Apr. 10, 1969 and entitled "Quick Slack Adjuster for Locomotive Brakes", now U.S. Pat. No. 3,613,840. This invention relates to improvements in brake adjustment devices for locomotives and more particularly, but not by way of limitation, to a quick slack adjuster device for locomotive brakes.

Locomotives, and particularly diesel locomotives, are normally provided with friction type shoes engagable with the outer periphery of the locomotive wheels for slowing or braking the speed thereof. The brake shoes wear relatively rapidly and it becomes necessary to adjust the slack due to the wear thereof in order to maintain an efficient braking operation. Screw type slack adjusters are in widespread use today for adjusting the locomotive brakes. However, these devices are not only expensive but require a great amount of time for adjusting the slack in the brake system, and are particularly time consuming when it is necessary to replace worn brake shoes. For example, it requires approximately 30 minutes to one hour to screw the adjustment device out and screw it back in. This is a great disadvantage, particularly when it is considered that it is usually necessary to renew brake shoes relatively frequently. In addition, the screw type adjustment devices require lubricating or greasing about once a month, which is an added exposure and time consuming matter. In an effort to overcome the disadvantages of the screw type adjusting devices, a sliding type adjuster was developed as shown in the W. H. Nolan et al. U.S. Pat. No. 3,527,325, issued Sept. 8, 1970 and entitled "Slack Adjuster." This device has certain disadvantages, however, in that the cylindrical sliding member may turn or rotate within the cylindrical sleeve and it is extemely difficult to reorientate the aperatures of the sliding members with the sleeve through which it passes.

The present invention contemplates a novel slide bar type brake adjusting apparatus wherein all adjustment operation, whether in or out, may be completed in approximately four minutes time. The cost of the device is extremely low compared to the cost of presently available devices, and there is no necessity for lubricating or greasing, thus substantially eliminating any labor requirement for maintenance. One end of the slide bar is connected with a brake lever and the bar extends non-rotatably but slidably through a trunnion which is carried by the usual pull rods provided on the locomotive braking apparatus. As the brake shoes become worn, or when it is necessary to adjust the brake cylinder piston travel for any reason, the slide bar may be quickly and easily pulled or pushed through the trunnion member, depending upon the type of adjustment required. The movement of the slide bar pivots the brake lever for repositioning the brake shoe with respect to the outer periphery of the wheel. When the brake shoe is properly adjusted, a keeper pin may be inserted through the trunnion and slide bar for securely retaining the slide bar in position and assuring an efficient holding of the brake shoe in the adjusted position thereof. When it is necessary to change or replace the brake shoe, the keeper pin may be removed from the trunnion member and slide bar and the bar may be quickly and easily pulled through the trunnion member for moving the brake lever sufficiently to pull the brake shoe away from the wheel to a position wherein access to the brake shoe is readily provided. Upon replacement of the brake shoe, the slide bar may be pushed through the trunnion for moving the brake lever sufficiently for positioning the new brake shoe in the desired position with respect to the brake cylinder piston travel. The keeper pin may be replaced in the trunnion and slide bar for efficiently retaining the brake cylinder piston in the proper position, and the spring urged lever may be placed over the keeper pin for retaining the keeper pin in position.

It is an important object of this invention to provide an adjustment device for locomotive brakes wherein the brakes may be quickly adjusted to assure an efficient braking operation.

Another object of this invention is to provide a slack adjuster device for locomotive brakes wherein maintenance of the device requires a minimum of time and expense for reducing the overall cost of maintenance of the brakes.

Still another object of this invention is to provide a slack adjuster device for locomotive brakes wherein the time required for changing or adjusting a set of brakes is greatly reduced.

A still further object of this invention is to provide a slack adjuster device for locomotive brakes wherein the device may be securely retained in substantially any desired adjustable position.

A further object of this invention is to provide a novel slack adjuster for locomotive brakes which is simple and efficient in operation and economical and durable in construction.

Other and further objects and advantageous features of the present invention will hereinafter more fully appear in connection with a detailed description of the drawings in which.

Figure 1:
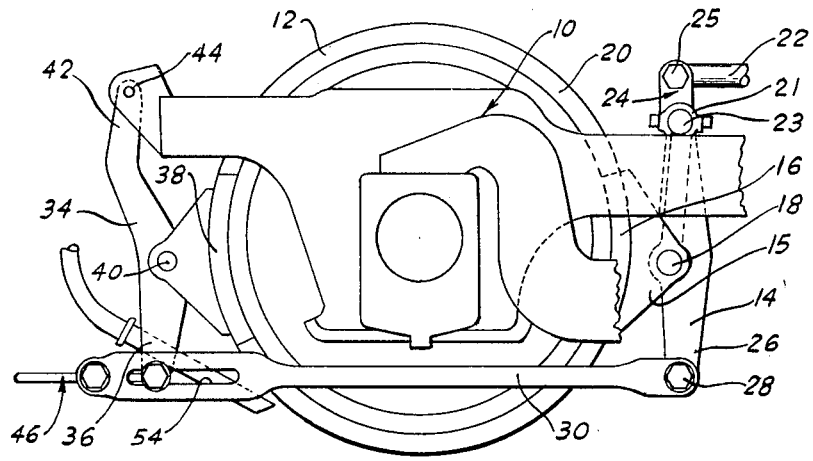
FIG. 1 is a side elevational view of a portion of one type of locomotive truck having a brake device thereon and provided with a slack adjuster embodying the invention.

Referring to the drawings in detail, reference character 10 generally indicated a truck body for a locomotive (not shown) and having a plurality of wheels 12 (only one of which is shown in the drawings) suitably journalled thereon as is well known. A first brake lever 14, commonly known as the live brake lever, has a first brake head 15 and frictional type brake shoe 16 pivotally secured thereto intermediate the ends thereof as shown at 18 and is adapted for intermittent engagement with the cylindrical braking surface 20 of the wheel 12, as is well known. The live lever 14 is suitably connected with the usual piston rod 22 of the usual braking cylinder (not shown) normally provided on the locomotive truck 10 for actuation of the brakes. For example, one end 21 of the lever 14 may be pivotally connected at 23 to a bell crank or lever arrangement generally indicated at 24, which in turn may be pivotally connected at 25 to the piston rod 22 in a manner whereby movement of the rod 22 in a direction toward the wheel 12 will pivot the lever 14 in counterclockwise direction as viewed in FIG. 1 for moving the brake shoe 16 into a braking engagement with the wheel braking surface 20. Simultaneously the opposite end 26 of the lever 14 will be pivoted in a direction away from the wheel 12. Conversely, when the piston rod 22 moves in a direction away from the wheel 22, the lever 14 will be actuated for moving the brake shoe 16 away from or out of engagement with the braking surface 20, and will move the end 26 of the lever 14 in a direction toward the wheel 12.

The end 26 of the lever 14 is pivotally connected at 28 between a pair of spaced pull rods 30 and 32 and in the proximity of one end of the rods 30 and 32, as is well known. The rods 30 and 32 normally span the wheel 12 and extend in a left hand direction, as viewed in FIG. 1, from the lever 14 to a position beyond the wheel 12. A second lever 34, commonly known as the dead lever, has one end 36 thereof pivotally and slidably secured between the rods 30 and 32 in a manner and for a purpose as will be hereinafter set forth. A second brake head 37 and brake shoe 38 generally similar to the brake head 15 and brake shoe 16 is pivotally secured to the lever 34 intermediate the ends thereof as shown at 40 and is adapted for intermittent engagement with the braking surface 20 substantially oppositely disposed from the brake shoe 16, as is well known in this type of braking apparatus. The opposite end 42 is pivotally secured at 44 to a flange 46, or the like, rigidly secured to the truck 10. Thus, whereas the end 42 of the lever 34 is freely pivotal about the pivot 44, the end 42 is rigidly connected with the truck 10, as is well known. Of course, pivoting of the lever 34 in a counterclockwise direction about the pivot 44, as viewed in FIG. 1, will move the brake shoe 38 into a braking engagement with the wheel braking surface 20, and pivoting of the lever 34 in an opposite direction will disengage the brake shoe 38 from the braking surface 20.

It is usually preferable that the lever 14 comprises a pair of substantially identical lever members disposed in spaced relationship with the brake shoe 16 secured therebetween whereby an efficient braking force will be applied by the lever on the shoe during a braking operation. Of course, only one of the levers 14 is shown in FIG. 1.

Figure 2:
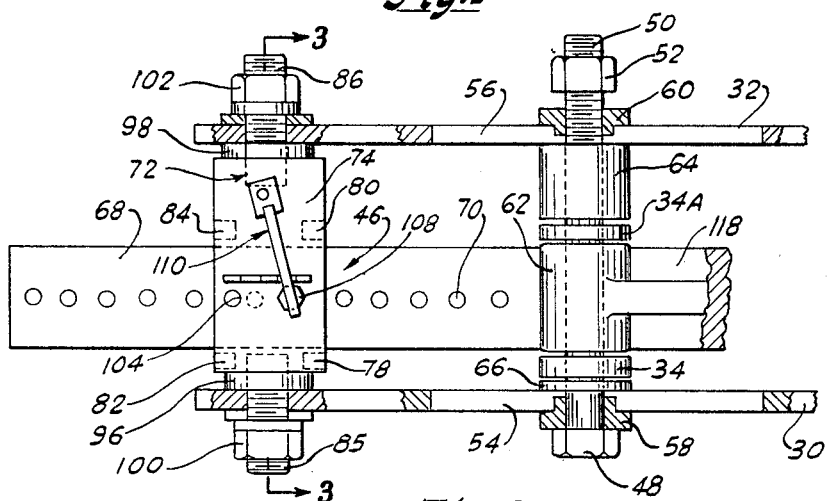
FIG. 2 is a plan view of a slack adjuster embodying the invention and secured to the pull rods of a brake apparatus.
Figure 3:
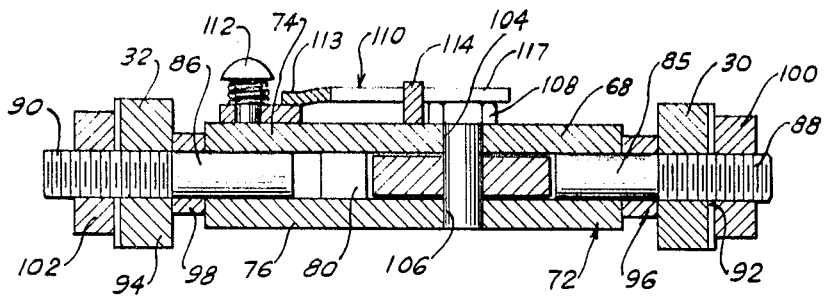
FIG. 3 is a sectional view taken on line 3—3 of FIG. 2.
Figure 4:
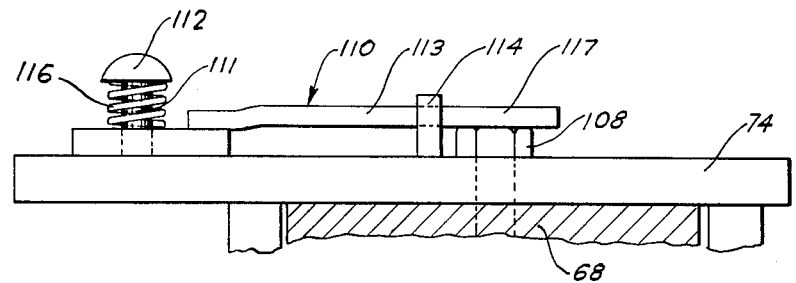
FIG. 4 is an enlarged side elevational view of the keeper lever utilized in the invention.
Figure 5:
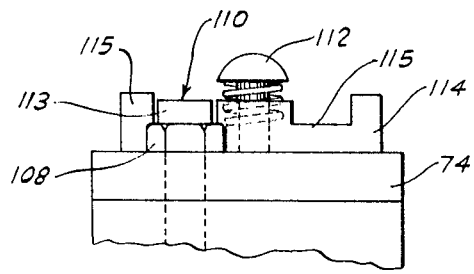
FIG. 5 is an end elevational view of the keeper lever.
Figure 6:
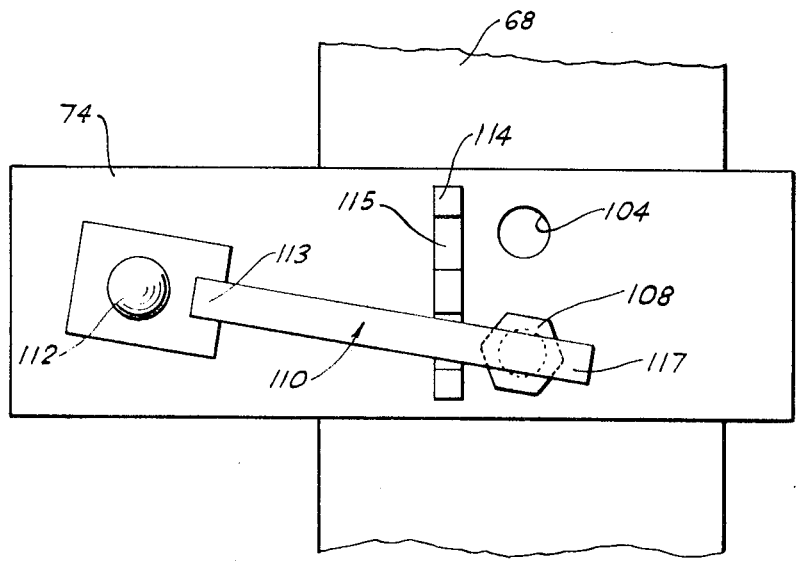
FIG. 6 is a top view of the keeper lever.

Similarly, it is usually preferable that the lever 34 comprises a pair of substantially identical spaced lever members 34 and 34a as shown in FIG. 2 having the brake shoe 38 secured therebetween. The ends 36 of the levers 34 and 34a are pivotally and slidably secured to the pull rods 30 and 32 by means of a slack adjuster apparatus generally indicated at 46 in a manner as follows:

The slack adjuster apparatus 46 comprises a first bolt or stud 48 having one end thereof threaded at 50 for receiving a nut 52 thereon. The bolt 48 extends transversely between the pull rods 30 and 32 and through a pair of aligned longitudinally extending slots 54 adn 56 normally provided in the pull rods 30 and 32, respectively. The ends 36 of the levers 34 and 34 a are interposed between the pull rods 30 and 32 in the proximity of the slots 54 and 56 and are apertured for receiving the stud 48 therethrough. Thus, the levers 34 and 34a are pivotally secured between the rods 30 and 32. A pair of oppositely disposed flanged guide sleeves 58 and 60 are disposed on the bolt 48 and ride in the slots 54 and 56, respectively, for guiding the sliding movement of the bolt 48 therein as will be hereinafter set forth.

A sleeve or cylindrical member 62 is disposed on the bolt 48 and is interposed between the spaced lever 34 and 34a as particularly shown in FIG. 2. In addition, a spacer sleeve 64 is disposed on the stud or bolt 48 between the lever 34a and the pull rod 32, and a spacer member 66 is disposed on the bolt 48 between the pull rod 30 and the lever 34. The nut 52 may be threaded onto the end 50 of the bolt 48 to secure the bolt 48 in position between the pull rods 30 and 32.

A slide bar 68 is welded or otherwise rigidly secured to the outer periphery of the sleeve 62 and extends radially outward therefrom in a direction away from the wheel 12. The bar 68 is preferably of a substantially flat elongated configuration and is provided with a plurality of longitudinally spaced apertures 70. The apertures are preferably spaced at intervals of approximately one inch, but not limited thereto. The slide bar 68 extends through a trunnion member generally indicated at 72 and is slidable but non-rotatable with respect thereto for a purpose and in a manner as will be hereinafter set forth.

The trunnion 72 comprises a pair of spaced plate members 74 and 76 slidably receiving the bar 68 therebetween. The plates 74 and 76 are spaced apart by a first pair of spacer blocks 78 and 80 disposed on opposite sides of the bar 68 and a second pair of spacer blocks 82 and 84 disposed on opposite sides of the bar 68 in spaced relationship with respect to the blocks 78 and 80. The blocks 78, 80, 82 and 84 are preferably welded or otherwise rigidly secured between the plates 74 and 76 and maintain the spacing between the plate 74 and 76 slightly greater than the depth of the bar 68 for assuring an efficient sliding of the bar 68 therebetween. In addition, the blocks 78, 80 and 82 and 84 provide a guide for the bar 68 during any sliding thereof with respect to the plates 74 and 76.

The trunnion 72 is further provided with a pair of substantially identical stud members 84 and 86 disposed between the plates 74 and 76 and extending in longitudinally opposite directions therefrom. The outer ends of the studs 85 and 86 are threaded at 88 and 90, respectively, and extend through aligned apertures 92 and 94 provided in the pull rods 30 and 32, respectively. Suitable spacer sleeves 96 and 98 are disposed on the studs 85 and 86, respectively, and are interposed between the plates 74 and 76 and the pull rods 30 and 32. In addition, suitable nuts 100 and 102 are secured on the threaded ends 88 and 90, respectively, for retaining the studs 85 and 86 in position. Upon assembly of the trunnion 72, the plates 74 and 76 may be inserted over the slide bar 68 and the studs 85 and 86 inserted through the respective apertures 92 and 94 and into position between the plates 74 and 76, and subsequently welded or otherwise rigidly secured between the plates.

The plate 74 is provided with at least two spaced apertures 104 in alignment with the plurality of apertures 70 provided in the slide bar 68. The apertures 70 are preferably spaced one inch apart, but not limited thereto. The apertures 104 are preferably 1½ inches apart, but not limited thereto. This provides a ratio of one inch to one and one-half inches in the spacing of the apertures of the slide bar and the plate. The plate 76 is similarly provided with at least two spaced apertures 106 in alignment with the apertures 104. The slide bar 68 may be secured between the plate 74 and 76 in substantially any preselected position by positioning one of the apertures 70 in alignment between one set of the bores 104 and 106, and inserting a suitable keeper pin 108 therethrough. The axes of the apertures 70 and the apertures 104 and 106 are always parallel with each other thus facilitating the alignment therebetween. The keeper pin 108 may be removably retained in position by a keeper lever generally indicated at 110 which extends over the head of the pin 108 as will be hereinafter set forth. The keeper lever 110 is preferably a spring urged lever, but not limited thereto.

The keeper lever 110 comprises a pin 111 suitably and pivotally mounted on the plate 74 and having an enlarged head member 112 on the outer end thereof. A lever arm 113 has one end slidably mounted on the pin 111 between the plate 74 and the head 112 and extends in a cantilever fashion outwardly from the pin 111 toward and beyond an upstanding bracket 114 secured to the plate 74 and spaced slightly from the apertures 104. the bracket 114 is provided with a plurality recesses 115 (preferably equal in number to the apertures 104 and in similarly spaced relationship) for receiving the outer end of the lever 113 therein. Suitable spring means 116 is provided around the pin 111 between the lever 113 and the head 112 and bears against the lever 113 for constantly urging the lever in a downward direction or in a direction toward the plate 74. Thus, the outermost end 117 of the lever, which extends beyond the apertures 104, will be in the proximity of or will rest on the head of the bolt or keeper pin 108 disposed in the aperture 104. The end 117 of the lever may be disposed in the particular recess 115 which is most nearly in alignment with the aperture 104 wherein the keeper pin 108 is disposed.

As shown in FIG. 2, a bracket member 118 is welded or otherwise secured to the outer periphery of the sleeve 62 and extends radially outward and downward therefrom in an opposite direction from the slide bar 68. The bracket 118 is provided with a plurality of apertures (not shown) whereby a suitable sand pipe (not shown) may be secured thereto for distributing sand to the vicinity of the track (not shown) and wheels, as is well known. This is particularly for use on all locomotive wheels having a sand pipe carried by the brake rigging. On other types of locomotives wherein the sand pipe is not utilized, the bracket member 118 may be completely eliminated, if desired.

In use, the stud 48 is adjusted in the slots 54 and 56 at the proper position with respect to the wheel 12, and particularly the friction surface 20 thereof, whereby the levers 34, 34a and 14 will be properly positioned to cause the brake shoes 38 and 16 to efficiently engage the friction surface 20. This is accomplished by manually moving the slide bar 68 with respect to the trunnion 72 whereby the sleeve 62 transmits movement to the stud 48. When the stud 48 is at the preselected position, the bar 68 is positioned in the trunnion 72 with the aperture 70 in the closest proximity of a set of apertures 104 and 106 in alignment therewith for receiving the keeper pin 108 therethrough. Since the apertures 70 preferably at one inch spacing intervals, and the apertures 104 and 106 are preferably at 1½ intervals, it is possible to provide adjustment positions of the slide bar 68 every one-half inch, which as a practical matter is sufficient for brake adjusting devices of this type.

When the piston rod 22 is actuated by the braking cylinder (not shown) for applying the brakes, as is well known, the live lever 14 is pivoted in a direction for moving the shoe 16 against the braking system 20, and simultaneously for pulling the pull rods 30 and 32 in a right hand direction as viewed in FIG. 1. The trunnion 72 moves simultaneously with the pull rods 30 and 32, and the slide bar 68 secured thereto transmits simultaneous movement to the stud 48 and thence to the ends 36 of the brake levers 34 and 34a. This moves the ends 36 in a right hand direction, as viewed in FIG. 1, and causes the brake shoe 38 to engage the friction surface 20.

When the brake shoes 16 and 38 become worn, or it is necessary to adjust the position thereof for any reason for increasing the braking efficiency, the keeper 110 may be moved from engagement with the pin 108 and the keeper pin 108 may be removed for releasing the slide bar 68 from engagement with the trunnion 72. The slide bar 68 may then be quickly and easily manually moved in the proper direction for adjusting the position of the stud 48 within the slots 54 and 56 to provide the desired adjustment of the brake levers 34 and 34a. Of course, it will be apparent that adjustment of the position of the brake levers 34 and 34a will also effect the efficiency of the brake lever 14 in a corresponding manner. The slide bar 68 may again be secured to the trunnion in the manner as hereinbefore set forth securing the stud 48 in the selected position within the slots 54 and 56.

Of course, when it is necessary to completely replace the brake shoes 16 and 38, the keeper pin 108 may be removed from the bar 68 and trunnion 72 and the bar 68 may be pulled through trunnion 72 in a left hand direction as viewed in FIGS. 1 and 2 until the stud 48 is in the extreme left end of the slot 54. This pivots the levers 34 and 34a in a direction for moving the brake head 37 away from the wheel 12 to provide sufficient clearance for removing and replacing the worn brake shoe 38. It will be apparent that this also provides sufficient freedom of movement for the lever 14 to move the brake head 15 away from the wheel 12 for removal and replacement of the shoe 16.

It is to be noted that the slack adjuster apparatus 46 may be installed on substantially any existing type locomotive brake rigging by simply removing the normal or presently existing screw type adjuster and substituting the apparatus 46 therefor. The stud 48 is normally already present on the screw type adjuster and the sleeve 62 may be easily disposed thereon as shown herein. The trunnion 72 may be substituted for the screw and nut portion of the screw type adjuster and the slide bar 68 is inserted therethrough. As a practical matter, it has been found that the apparatus 46 may be utilized with approximately 80 per cent to 90 per cent of presently existing locomotive brake rigging with no alteration of the brake rigging itself.

The lever arm 113 may be raised against the action of the spring means 116 for moving of the lever away from engagement with the keeper pin 108 when it is desired to remove the pin 108 for releasing the locking engagement of the slide bar 68. Of course, the arm 113 is also pivotal with respect to the housing 112 for facilitating manipulation of the lever 117. When the adjustment of the slide bar 68 has been made and the keeper pin 108 re-inserted through an aperture 104, the lever arm 113 may again be disposed with the outer end 117 thereof placed in engagement with or in the proximity of the head of the keeper pin 108.

From the foregoing it will be apparent that the present invention provides a novel slack adjuster for locomotive brakes wherein the brakes may be quickly and easily adjusted by manual reciprocation of a slide bar having one end in operable connection with a brake lever and having the opposite end extending through a trunnion member carried by the pull rods of the braking apparatus. The slide bar may be secured in the trunnion member by means of a keeper pin, which may be readily removed when it is desired to adjust the position of the bar. In addition, the brake lever is secured to the pull rods in a manner providing for quick disengagement of the brake lever when it is necessary to replace the brake shoes for any reason. The novel slack adjuster apparatus may be installed on substantially any presently available locomotive braking apparatus with a minimum of alteration of the braking apparatus by merely removing the usual screw type adjusting apparatus and installing the slack adjuster of the present invention in lieu thereof. The novel slack adjuster greatly reduces the time required for adjusting the brakes, and is particularly designed and constructed for reducing maintenance of the adjusting apparatus to a minimum.

Whereas the present invention has been described in particular relation to the drawings attached hereto, it should be understood that other and further modifications, apart from those shown or suggested herein, may be made within the spirit and scope of this invention.

What is claimed is:

1. In combination with a locomotive brake apparatus having brake levers and pull rods, a slack adjuster device comprising means removably and slidably securing at least one brake lever to the pull rods, trunnion means secured to the pull rods and movable simultaneously therewith, slide bar means carried by the first mentioned means and extending slidably through the trunnion means, and keeper pin means cooperating between the slide bar means and trunnion means for securing the slide bar means at substantially any desired position with respect to the trunnion means for securing the brake lever in substantially any desired position with respect to the pull rods, and keeper lever means pivotally secured to the first mentioned means and cooperating with said keeper pin means for retaining the keeper pin against accidental removal from the slide bar means and trunnion means.

2. In combination with a locomotive brake apparatus having brake levers and pull rods, a slack adjuster device comprising means removably and slidably securing at least one brake lever to the pull rods, trunnion means secured to the pull rods and movable simultaneously therewith, slide bar means carried by the first mentioned means and extending slidably through the trunnion means, and keeper pin means cooperating between the slide bar means and trunnion means for securing the slide bar means at substantially any desired position with respect to the trunnion means for securing the brake lever in substantially any desired position with respect to the pull rods, and keeper lever means cooperating with said keeper pin means for retaining the keeper pin against accidental removal from the slide bar means and trunnion means, said keeper lever means comprising a spring urged lever having one end normally disposed in the proximity of the keeper pin means.

3. In combination with a locomotive brake apparatus having brake levers and pull rods, a slack adjuster device comprising means removably and slidably securing at least one brake lever to the pull rods, trunnion means secured to the pull rods and movable simultaneously therewith, slide bar means carried by the first mentioned means and extending slidably through the trunnion means, and keeper pin means cooperating between the slide bar means and trunnion means for securing the slide bar means at substantially any desired position with respect to the trunnion means for securing the brake lever in substantially any desired position with respect to the pull rods, and keeper lever means cooperating with said keeper pin means for retaining the keeper pin against accidental removal from the slide bar means and trunnion means, said keeper lever means comprising a spring urged lever member pivotally secured to the trunnion means, bracket means for receiving the lever and supporting the lever in a normal position in the proximity of the upper end of the keeper pin means.

4. In combination with a locomotive brake apparatus having brake levers and pull rods, a slack adjuster device comprising means removably and slidably securing at least one brake lever to the pull rods, trunnion means secured to the pull rods and movable simultaneously therewith, slide bar means carried by the first mentioned means and extending slidably through the trunnion means, and keeper pin means cooperating between the slide bar means and trunnion means for securing the slide bar means at substantially any desired position with respect to the trunnion means for securing the brake lever in substantially any desired position with respect to the pull rods, and keeper lever means cooperating with said keeper pin means for retaining the keeper pin against accidental removal from the slide bar means and trunnion means, said bracket means comprising a support bracket secured to the trunnion means, said bracket being provided with recess means for selectively receiving the lever therein.

5. In combination with a locomotive brake apparatus having brake levers and pull rods, a slack adjuster device comprising means removably and slidably securing at least one brake lever to the pull rods, trunnion means secured to the pull rods and movable simultaneously therewith, slide bar means carried by the first mentioned means and extending slidably through the trunnion means, and keeper pin means cooperating between the slide bar means and trunnion means for securing the slide bar means at substantially any desired position with respect to the trunnion means for securing the brake lever in substantially any desired position with respect to the pull rods, and keeper lever means cooperating with said keeper pin means for retaining the keeper pin against accidental removal from the slide bar means and trunnion means, said keeper lever means comprising a housing secured to the trunnion means, a spring urged lever pivotally secured to the housing and extending outwardly therefrom, a support bracket secured to the trunnion means and spaced from the housing, said support bracket being provided with recess means for selectively receiving the lever therein and supporting the lever in the proximity of the upper end of the keeper pin means.

* * * * *